Jan. 27, 1953
J. B. SEBOK
2,626,677
AIR CLEANER, INTAKE SILENCER, AND
CARBURETOR HOUSING ASSEMBLY
Filed Feb. 28, 1950
2 SHEETS—SHEET 1
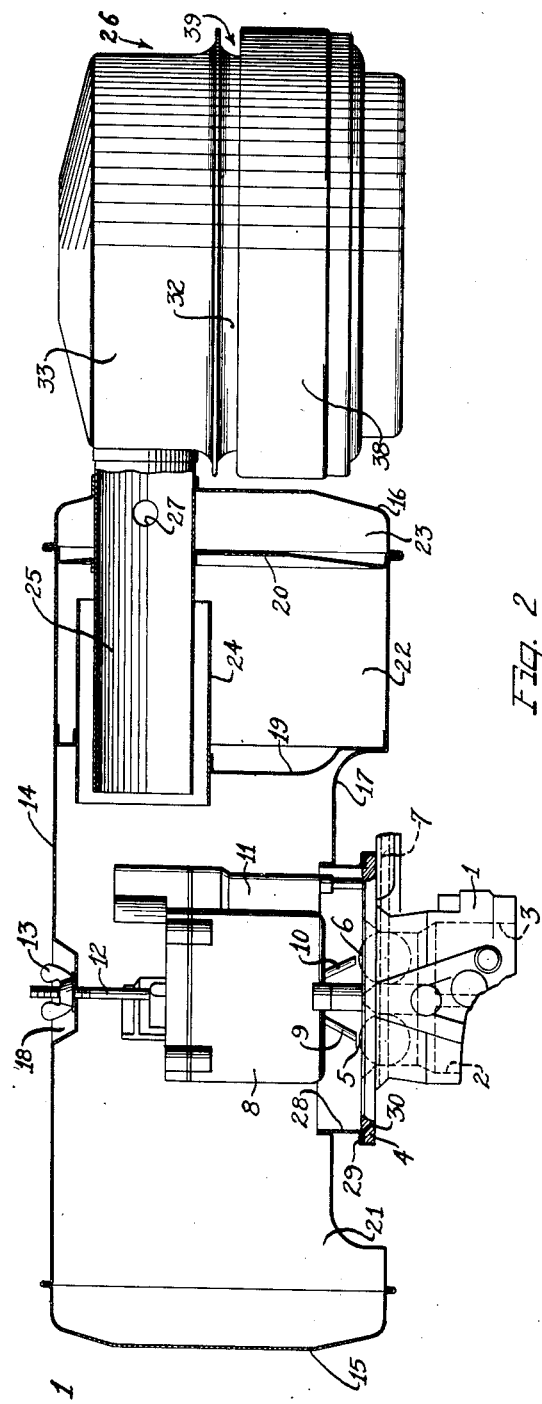
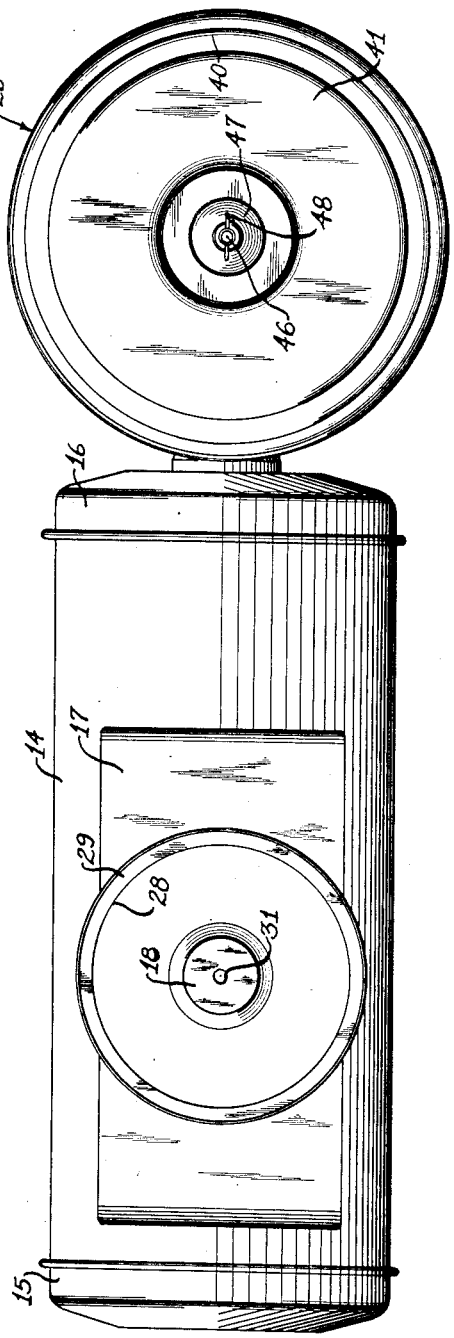
Inventor
Joseph B. Sebok

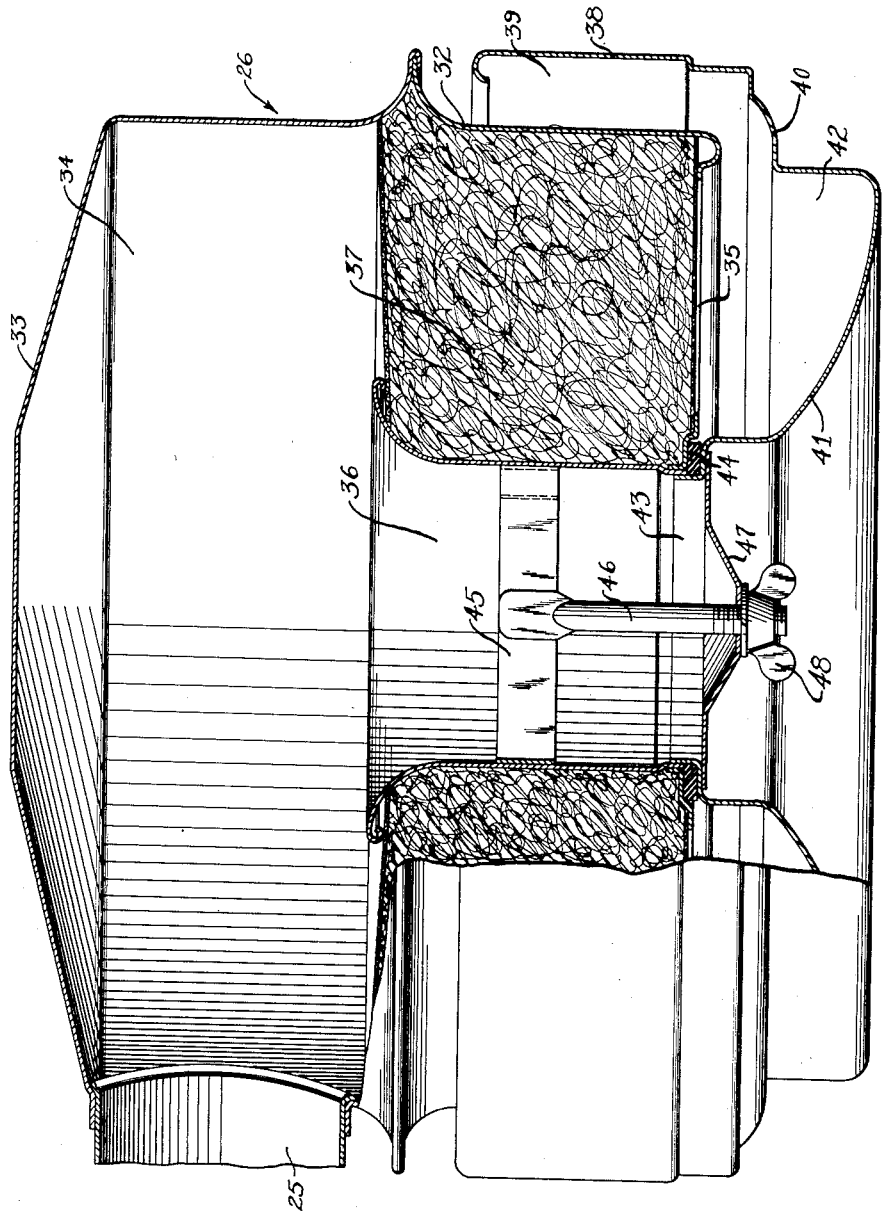

Patented Jan. 27, 1953

2,626,677

UNITED STATES PATENT OFFICE 2,626,677

AIR CLEANER, INTAKE SILENCER, AND CARBURETOR HOUSING ASSEMBLY

Joseph B. Sebok, Detroit, Mich., assignor to Houdaille-Hershey Corporation, Detroit, Mich., a corporation of Michigan Application February 28, 1950, Serial No. 146,815

6 Claims. (Cl. 183—15)

This invention relates to improvements in an air cleaner, intake silencer and carburetor housing assembly, and more particularly to an assembly for connection with a carburetor in a manner to function as a housing for the carburetor, the assembly including both air cleaning and intake silencing means although the invention may have other uses and purposes as will be apparent to one skilled in the art.

The instant invention is an improvement upon the invention set forth, described, and claimed in my copending application entitled "Combination Air Cleaner, Intake Silencer and Carburetor," filed November 8, 1949, Serial No. 126,115.

As more fully pointed out in my above identified copending application, it is now recognized as essential in connection with automotive vehicles and especially passenger vehicles to provide an air cleaner to cleanse the air entering the carburetor, and to silence what have been termed intake noises emanating from the engine through the carburetor. The space between the carburetor and the hood of an automobile has in the past years steadily decreased adding to the difficulty of providing sufficient air cleaning and silencing means and locate them properly underneath the hood of an automobile. This space between the carburetor and hood is steadily decreasing especially in the new designs of automobiles. Efforts have been made to supply the adequate cleaning and silencing mechanism, and some of these efforts entailed the disposition of such mechanism at a point remote from the carburetor which is not desirable, while in other cases the cleaning and silencing mechanism had a monstrous appearance when the hood of an automobile was raised.

One of the big difficulties with cleaning and silencing assemblies heretofore known was the lack of economy in manufacture. This was especially true where different engines requiring substantially the same air capacity were involved. An assembly for one of those engines would not function as an assembly for the other of the engines, not because there were changes necessary in the air cleaner portion, but because of the noise characteristics differing between the engines so as to require different silencers. Accordingly, if one assembly was built for one engine, new dies would have to be made and utilized and a new design created and tested to provide silencing equipment for the other engine.

In addition, with formerly known devices of this kind, the carburetor employed the customary heavy casting for a housing, held in place by a number of bolts, and utilized the customary intake horn, necessitating a clamp to connect the outlet conduit from the cleaner and silencer assembly to the intake horn. Further, where these assemblies had to be disposed at a point somewhat distant from the carburetor in order to get them under the hood of an automobile, the silencer was objectionably far from the source of sound whereby the sound had opportunity to spread and be amplified before reaching the silencing means thereby detracting from the efficiency of the silencing means.

With the foregoing in mind, it is an important object of the instant invention to provide an economical air cleaning and intake silencing assembly wherein the construction is such that the silencer may be tuned or varied throughout a wide range without the necessity of employing new dies and similar manufacturing equipment for the provision of a silencer for sounds of different wave lengths.

It is also an object of this invention to provide an air cleaning and silencing assembly for association with a carburetor, in such manner that the opening in the carburetor through which sounds coming from the engine exit is in direct communication with a sound attenuating chamber.

Also a feature of this invention resides in the provision of an intake silencer arrangement for association with the carburetor of an internal combustion engine, wherein the opening in the carburetor through which sounds emanating from the engine exit opens directly into a sound attenuating chamber of the silencer arrangement so that the sounds need travel no distance whatever from the carburetor opening before attenuation is under way.

Still a further feature of this invention resides in the provision of an air cleaner and intake silencer assembly constructed so that the assembly functions as a housing for a carburetor, and the carburetor projects directly into a sound attenuating chamber of the assembly.

Another object of this invention is the provision of an air cleaner and intake silencer assembly arranged to function as a housing for a carburetor and which assembly can readily be made so that the entire assembly projects substantially no further above the top of the carburetor mechanism than did carburetor housings utilized heretofore.

Still another object of this invention resides in the provision of an air cleaner and intake silencer assembly embodying a plurality of sound attenuating chambers, and which assembly may readily be varied to change the size, add or subtract attenuating chambers from the original number, without the need of providing new and expensive dies to manufacture the changed construction.

It is also an object of this invention to provide an air cleaner and intake silencer assembly in which the air cleansing means are of the liquid bath type and wherein the liquid cup may readily be removed from the air cleansing means for servicing, without requiring the entire assembly to be separated from a carburetor, even though the assembly may function as the housing for the carburetor.

A further feature of the invention resides in the provision of an intake silencer arrangement that may be connected to a carburetor in such a manner that when sound waves from the engine exit from the carburetor they are already in a sound attenuating chamber.

Still another feature of the instant invention resides in the provision of an air cleaning and intake silencer assembly, wherein the outlet conduit from the air cleaning means functions as a tuning tube for an attenuating chamber of the silencer means.

While some of the more salient features, characteristics and advantages of the instant invention have been above pointed out, others will become apparent from the following disclosures, taken in conjunction with the accompanying drawings, in which—

Figure 1 is a part central vertical sectional, part elevational view of an air cleaner and intake silencer assembly embodying improvements of the instant invention, showing the same in operative association with the carburetor of an internal combustion engine, the carburetor being illustrated in elevation, the silencing means in central vertical section, and the air cleaning means in side elevation;

Figure 2 is a bottom plan view of the air cleaner and silencer assembly of Fig. 1, with the carburetor removed; and Figure 3 is an enlarged fragmentary part central vertical sectional and part elevational view of the air cleansing means seen in the right hand portion of Fig. 1, with interior portions of the structure shown in elevation.

As shown on the drawings:

The illustrated embodiment of the instant invention is shown associated with a carburetor of the downdraft type, and of a type designed for supplying a V–8 internal combustion engine with the proper fuel mixture. Such a carburetor has two separate discharge ports, one leading to each side of the V–8 engine. It will, of course, be understood that the instant invention may equally as well be associated with other forms of carburetors, including those having only a single discharge opening, a single throttle valve, a single choke valve, etc. Except for those parts of the carburetor that need be mentioned in order to fully present the instant invention, the carburetor is illustrated only diagrammatically.

The illustrated carburetor embodies a base portion 1 which may be connected to an internal combustion engine in a known manner. Inside that base portion are discharge or mixing chambers in which air is mixed with the liquid fuel and from which the outflow of the fuel mixture may be controlled by suitable throttle valves, not shown in the drawings. At the upper part of this base portion 1 is a housing support in the form of a transversely disposed platform 4 suitably ported to admit air and fuel into the chambers 2 and 3, the ports being controlled respectively by choke valves 5 and 6 controlled in unison by way of a shaft 7 which may in turn be operated either manually or automatically.

Above the platform 4 is a suitable structure 8 containing the float chamber from which liquid fuel is delivered to the chambers 2 and 3 through discharge pipes 9 and 10, respectively, and adjacent the float chamber is a suitable structure 11 containing an accelerating pump. Upstanding from the float chamber structure of the carburetor is a bolt 12 equipped with a threaded wing nut on its outer end, by means of which the air cleaner and intake silencer assembly may be connected to the carburetor.

Heretofore, owing to the open condition of the ports controlled by the choke valves 5 and 6, and the open lower ends of the liquid fuel pipes 9 and 10, the entire portion of the carburetor above the platform 4 was enclosed in a relatively heavy housing. The air cleaner and intake silencer assembly was separate and apart from the carburetor, and connected therewith by way of an outlet conduit clamped or otherwise secured to an intake horn carried by the carburetor housing. Such structure is unnecessary with the present invention, wherein the air cleaner and intake silencer assembly function as the housing for the carburetor.

The illustrated embodiment of the instant invention includes a casing 14 of substantially cylindrical form and preferably with its long axis disposed horizontally. This casing may be provided with end closures 15 and 16 attached to the body of the casing in any suitable manner such as by lock seaming. On the underside thereof the casing wall is recessed as indicated at 17, and this recess may be of any desirable depth, depending upon how low in relation to the carburetor it is desired to have the cleaner and silencer assembly extend. Obviously, the assembly is only limited as to its most downward position by contact with the uppermost part of the carburetor structure. The upper part of the casing wall may also be recessed as at 18 to accommodate the aforesaid wing nut 13.

Inside the casing 14, in the illustrated instance, are transverse partitions 19 and 20 which divide the interior of the casing into sound attenuating chambers, including a relatively large chamber 21 for the attenuation of the heavier sounds of relatively low frequency, a smaller chamber 22 for the attenuation of higher frequency sounds, and a still smaller chamber 23 for the attenuation of still higher frequency sounds. A tuning tube 24 connects the large chamber 21 with the next smaller chamber 22. Mounted in the partition 20 is an outlet conduit 25 through which cleaned air exits from an air cleaner structure generally indicated by numeral 26. This clean air outlet conduit 25 serves as the connection, in the illustrated showing, between the air cleaning means and the silencing means of the assembly. The outlet conduit 25 is coaxial with but of smaller size than the aforesaid tuning tube 24, and the outlet conduit also functions as a tuning tube for the smallest silencing chamber 23 with which communication is established by one or more openings 27 in the outlet conduit.

On the underside, the casing 14 is provided with a suitable opening in which a flange 28 is set, which flange is stepped outwardly and downwardly as indicated at 29 to intimately embrace the top margin and edge of the platform 4 on the carburetor. Between the platform and the flange a gasket 30 may be disposed as seen clearly in Fig. 1. The device may be attached to the platform of the carburetor in air tight condition by extending the aforesaid bolt 12 through a suitable aperture 31 in the recess portion 18 at the top of the casing, and tightening the wing nut 13. With the aid of a gasket, an air tight seal is thus established.

With this arrangement, it will be especially noted that the carburetor projects directly into the attenuating chamber 21. Sounds emanating from the engine will exit from the carburetor through the open choke valves 5 and 6, and the sound waves coming through the ports controlled by these valves will pass directly into the attenuating chamber 21 without any intermediate travel. Thus, attenuation of the major or predominant low wave tone coming from the engine is effected immediately with no chance of spreading or amplification of this low wave length sound.

The air cleaning means connected with the silencer arrangement above described are best seen in Fig. 3. In the illustrated instance, the air cleaner is of the liquid bath type and includes an upper casing or filter holding shell 32 on which is a cover 33 to which the aforesaid outlet conduit 25 for clean air is secured. Inside the cover there is an open chamber 34 in direct communication with the outlet. The filter holding shell turns inwardly at the bottom thereof and is provided with a number of large openings 35 in the bottom face, the inner portion of the bottom of the shell being spot welded or equivalently secured to an open center tube 36. Between the center tube and the shell 32 is an annular filter mass 37 which may be of any suitable material such as curled cattle tail hair, wavy wire, bonded vegetable fiber, etc.

A separable casing section or liquid cup is also provided and includes an outer substantially cylindrical wall 38 of greater diameter than the filter holding shell 32 so as to leave a downwardly extending annular air inlet passage 39 therebetween. The bottom of the liquid cup turns inwardly below the inlet passage as at 40, then drops down, and extends inwardly and upwardly as at 41, to define a sump 42 for cleansing liquid, such as oil, therein. The upper inner end of the bottom is flanged as at 43 for free telescopic engagement with the inside tube 36 and to provide a seat for a gasket 44 upon which the lower end of the tube 36 and the adjacent margin of the bottom of the filter holder may rest. Inside the center tube is a Z bar or the equivalent 45 from which a bolt 46 depends, this bolt extending through a suitable aperture in a cap 47 closing the central opening in the liquid cup, and on the outside of the cup a wing nut 48 may be engaged with the bolt.

When it is desired to service the air cleaner, it is a simple expedient to loosen the wing nut 48, drop off the liquid cup, empty out the accumulated dirt and cleaning liquid, refill the cup to the proper level, and attach it again to the bolt 46. It will be especially noted that in order to service the air cleaner, the entire air cleaning and intake silencing assembly need not be removed from the carburetor.

In operation, when the assembly is connected to the carburetor in the manner above described, suction created by the engine draws air in through the annular inlet 39, downwardly into contact with cleansing liquid in the sump 42, and upwardly through the filter mass 37, the air then passing through the clean air outlet conduit 25 into the larger of the sound attenuating chambers 21. From this chamber, the air enters the carburetor to be mixed with liquid fuel through the ports governed by the choke valves 5 and 6. Sound waves emanating from the engine will pass directly through the choke valve ports into the larger attenuating chamber 21, wherein the predominant low tone of the engine will be effectively attenuated, while a higher tone will be attenuated in the chamber 22, and the predominant still higher pitched sound will be attenuated in the smallest chamber 23.

With this construction, it will be noted that the air cleaner and intake silencer assembly functions as a housing for the carburetor, and the attenuation of the predominant low tone occurs instantaneously, while the attenuation of the higher tones occurs as expeditiously as possible since the sound waves upon leaving the mixing chamber of the carburetor are never outside an attenuating chamber.

It will be especially noted, also, that the structure may be disposed as low as desired over the top of the carburetor. Further, with the instant arrangement it is a simple expedient to elongate the casing 14 or shorten this casing as may be desired to enable the assembly to be used with different engines, without resort to the making of new dies and expensive tools for that purpose. The end caps 15 and 16 of the casing need not be changed, and the central portion or body of the casing 14 is merely a simple rolling job, any die work needed for the indentation 17 being the same for any length casing. Obviously, the tuning tubes including the tube 24 and the outlet conduit for clean air 25 may be lengthened or shortened as desired.

Briefly, the fact that the assembly functions as a housing for the carburetor, the silencing arrangement may be varied at will without the necessity of new dies and tools, the air cleaner may be serviced without removing the entire assembly from the carburetor, and the fact that the attenuation chambers are as close as possible to the source of sound, individually and collectively render the instant invention highly desirable, versatile, and extremely economical.

It will be understood that modifications and variations may be effected without departing from the scope of the novel concepts of the present invention.

I claim as my invention:

1. In an air cleaner and intake silencer assembly for association with a carburetor, a casing, transverse partition means in said casing dividing the same interiorly into a plurality of sound attenuating chambers, air cleaning means, an outlet conduit from said air cleaning means extending into said casing a predetermined distance and terminating in a free end to function as a tuning tube for one of said chambers, and said casing having an opening in the wall thereof directly into one of said chambers for the reception of a carburetor.

2. In an air cleaner and intake silencer assembly, an elongated casing closed at the ends, partitions in said casing defining at least three sound attenuating chambers of different sizes, air cleaning means associated with said casing, an outlet conduit from said air cleaning means extending into said casing and through one of said chambers, said conduit having an opening therein to establish communication with said one chamber, a tuning tube coaxial with but of larger cross-sectional area than said conduit in the wall between the second and third chambers and into which said conduit freely extends to terminate in a free open end, and said casing having an opening in the side thereof leading into a chamber other than said one chamber for the reception of a carburetor.

3. In combination, a down-draft carburetor including a base portion having a passage therethrough, a platform on said base portion, and a partially enclosed choke valve in said passage adjacent said platform, and an intake silencer including a casing defining an interior sound attenuating chamber of the resonator type, said casing having an opening in the wall thereof, a sealing flange associated with said opening for contact with said platform with the upper part of said carburetor extending into said chamber to complete the enclosing of said valve, air cleaning means, and an outlet conduit from said air cleaning means in open communication with said chamber.

4. In combination, a down-draft carburetor having a partially enclosed choke valve through which both air and fuel may pass, and an intake silencer including a casing defining an interior sound attenuating chamber of the resonator type sized to neutralize the fundamental tone of the engine with which the carburetor is associated, means for supplying air to said chamber, and said casing having an opening through the wall of said chamber for receiving at least a part of said carburetor with said valve in direct communication with said chamber and said casing forming a housing for the received portion of the carburetor and completing the enclosing of said valve.

5. In combination, a carburetor having a partly covered region wherein air and fuel contact each other, and an intake silencer including a casing having a sound attenuating chamber which functions on the resonator principle and is sized to neutralize the fundamental tone of the engine with which the carburetor is associated, and said casing having an opening in a wall of said chamber through which the carburetor extends sufficiently for said casing to complete the covering of said region, and means to admit air to the casing.

6. In combination, a carburetor having a partly covered region wherein air and fuel contact each other, and an intake silencer including a casing having a sound attenuating chamber which functions on the resonator principle and is sized to neutralize the fundamental tone of the engine with which the carburetor is associated, and said casing having an opening in a wall of said chamber through which the carburetor extends sufficiently for said casing to complete the covering of said region, air cleaning means connected to said casing, and a clean air outlet conduit from said cleaning means discharging into said chamber.

JOSEPH B. SEBOK.

REFERENCES CITED

The following references are of record in the file of this patent:

UNITED STATES PATENTS

| Number | Name | Date |
|---|---|---|
| 2,214,731 | Kamrath | Sept. 17, 1940 |
| 2,287,806 | Kamrath | June 30, 1942 |
| 2,316,527 | Mieras | Apr. 13, 1943 |

FOREIGN PATENTS

| Number | Country | Date |
|---|---|---|
| 880,587 | France | Jan. 4, 1943 |